(12) United States Patent
Ernst et al.

(10) Patent No.: US 12,181,097 B1
(45) Date of Patent: Dec. 31, 2024

(54) HOBBY STAND

(71) Applicant: ERNST MANUFACTURING, INC., Sandy, OR (US)

(72) Inventors: Andrew Ernst, Sandy, OR (US); Gregory R Ernst, Eagle Creek, OR (US); Dylan G Ernst, Eagle Creek, OR (US)

(73) Assignee: ERNST MANUFACTURING, INC., Sandy, OR (US)

( * ) Notice: Subject to any disclaimer, the term of this patent is extended or adjusted under 35 U.S.C. 154(b) by 7 days.

(21) Appl. No.: 18/116,525

(22) Filed: Mar. 2, 2023

Related U.S. Application Data

(60) Provisional application No. 63/315,923, filed on Mar. 2, 2022.

(51) Int. Cl.
| | |
|---|---|
| *F16M 11/00* | (2006.01) |
| *B01L 9/00* | (2006.01) |
| *F16M 11/08* | (2006.01) |
| *F16M 11/22* | (2006.01) |

(52) U.S. Cl.
CPC ............. *F16M 11/08* (2013.01); *F16M 11/22* (2013.01); *B01L 9/00* (2013.01); *F16M 2200/066* (2013.01); *F16M 2200/08* (2013.01)

(58) Field of Classification Search
CPC ...... F16M 11/08; F16M 11/24; F16M 111/20; F16M 11/22; F16M 2200/066; F16M 2200/08; F16M 13/00
See application file for complete search history.

(56) References Cited

U.S. PATENT DOCUMENTS

| | | | | |
|---|---|---|---|---|
| 4,026,417 | A * | 5/1977 | Streim | A47F 5/02 |
| | | | | 211/163 |
| 4,534,474 | A * | 8/1985 | Ng | A47G 21/14 |
| | | | | 248/37.3 |
| 5,655,671 | A * | 8/1997 | Barry | A47F 5/02 |
| | | | | 211/163 |
| 5,992,912 | A * | 11/1999 | Zimm | A45D 44/04 |
| | | | | 220/756 |
| 8,210,373 | B2 * | 7/2012 | Liao | A47B 87/0246 |
| | | | | 211/144 |
| 8,398,049 | B2 * | 3/2013 | Lategan | F16M 11/08 |
| | | | | 248/125.7 |
| 8,636,259 | B2 * | 1/2014 | Manke | G01N 30/6047 |
| | | | | 248/512 |

* cited by examiner

*Primary Examiner* — Tan Le
(74) *Attorney, Agent, or Firm* — patenttm.us

(57) ABSTRACT

A hobby stand for supporting a workpiece includes a platform rotatably mounted on a variable height support member. The platform carries plural mounting holes for receiving support arms therein to provide an adjustable mounting support for the workpiece. The stand includes a base portion with compartments for holding items, including some with magnetic features to allow small metal parts to be kept.

20 Claims, 4 Drawing Sheets

HOBBY STAND

This application relates to stands for use by hobbyists and model builders and others for supporting work projects.

BACKGROUND

Hobbyists who assemble models or other projects need to support the model while it is being worked on, for ease of construction and to allow access to portions of the model while other parts may remain undisturbed.

SUMMARY

In accordance with the disclosure, a hobby stand is provided that fits a wide variety of projects including RC models, drones, scale modeling, model railroading, and crafts, as examples. The stand includes a base with a rotatable elevated platform that receives removable support arms in multiple positions, to allow adjustment to a wide range of projects. The base of the stand serves as a work tray with an anti-skid bottom, rubber grip handles and easy-scoop compartments.

The subject matter of the present technology is particularly pointed out and distinctly claimed in the concluding portion of this specification. However, both the organization and method of operation, together with further advantages and embodiments thereof, may best be understood by reference to the following description taken in connection with accompanying drawings wherein like reference characters refer to like elements.

DETAILED DESCRIPTION

The system according to a preferred embodiment of the present disclosure comprises a modular stand system for providing a support stand for working on models and the like and also providing storage/containment for workpieces and working materials.

Figure 1:
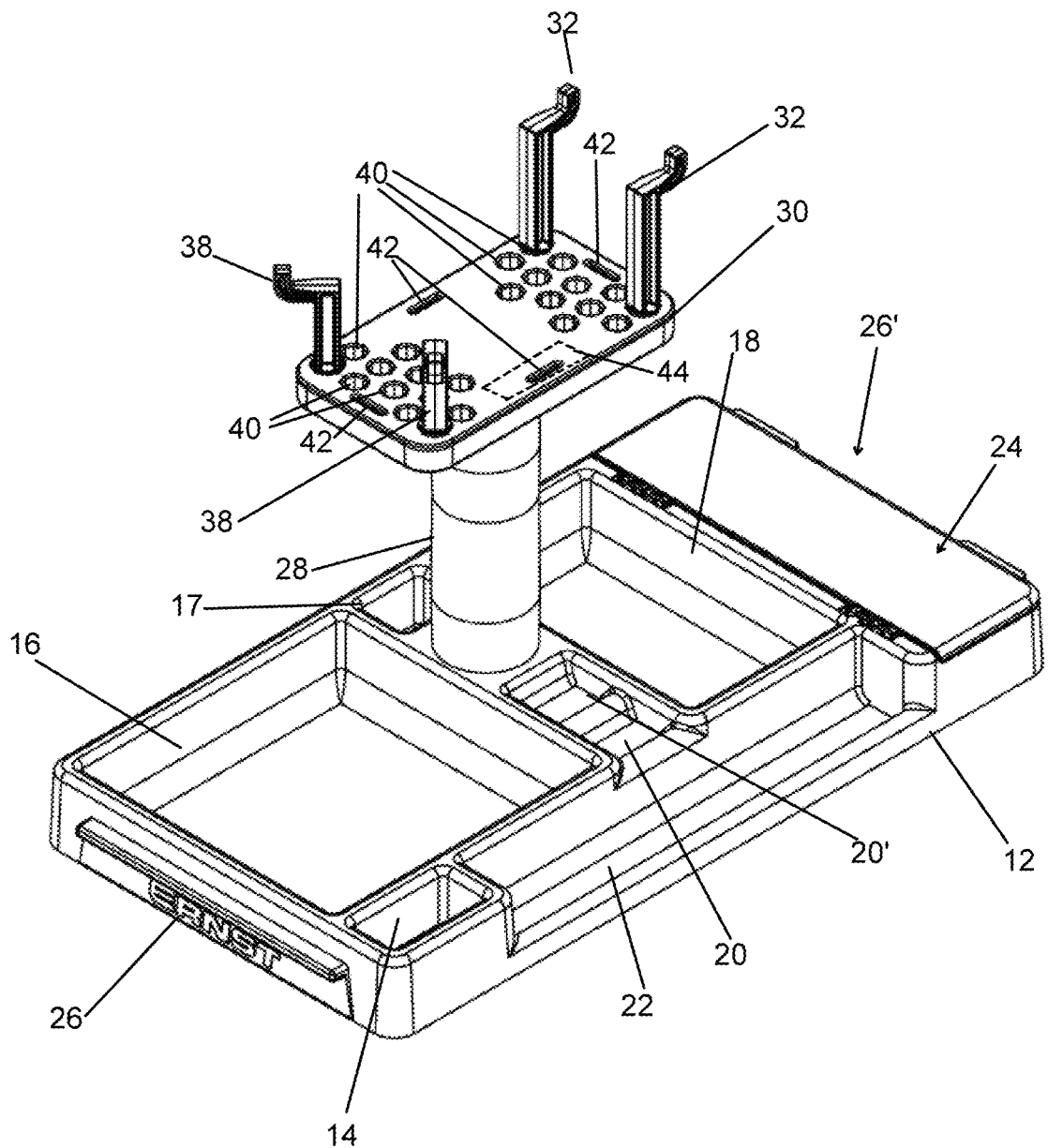
FIG. 1 is a perspective view of a hobby stand according to the preferred embodiment.

Referring to FIG. 1, a perspective view of a hobby stand in accordance with the disclosure, the hobby stand 10 comprises a base 12 that is rectangular in the illustrated configuration, and has plural interior compartments 14, 16, 17, 18, 20, 20', 22 and 24 defined therein. Compartment 24 has a closable lid that snaps shut and extends along one side of the compartment, for securing items inside the compartment. Some of the compartments, such as 20, 20' and 22, for example, may comprise magnetic surfaces for securing small metal pieces within the compartment to avoid loss of the parts. The base serves as a work tray, and includes an anti-skid bottom to prevent sliding of the stand when in use. Rubber grip handles 26, 26' are mounted at opposing ends on the shorter sides of the rectangular stand base. Some of the interior walls of the compartments may be tapered at angles other than vertical, to allow easy scooping of small parts out of the compartments.

A mounting post 28 fits into a receptacle 19 in the base (visible in FIG. 2) and extends upwardly, supporting a rectangular platform 30, that receives removable project support arms 32 and 38 therein via mounting holes 40 in the platform, multiple such holes being formed in the platform for allowing variation of the placement of the support arms. Two each of support arms 32 and 38 are shown in the illustration, and support arms 32 are longer length than support arms 38 in the illustrated embodiment. The support arms have an elongate central post portion 35, 35', an offset arm 36, 36' extending perpendicular to the central post, and a post 37, 37', extending upwardly, perpendicular to the offset arm (see FIG. 2). The platform 30 further includes through slots 42 along each side of the platform for enabling a project to be secured by straps or the like, to avoid inadvertent displacement of the project. The platform 30 may further include foam grip pads 44 (one such pad shown in phantom on FIG. 1), whereby a model or project can rest directly on the platform, if the support arms are removed, for example.

The mounting holes 40 have an octagonal cross section profile and the support arms have a corresponding octagonal cross section profile, with tapered lower end portions 34, 34' (visible in FIG. 2), the lower end portions having a shoulder edge, and below the shoulder edge having a tapered profile, being wider at the upper extent thereof and narrower extending downwardly, such that upon insertion of the tapered lower end portion into a mounting hole, insertion may continue until a frictional fit within the hole occurs, removably securing the support arm in the hole via a taper lock fit.

Figure 2:
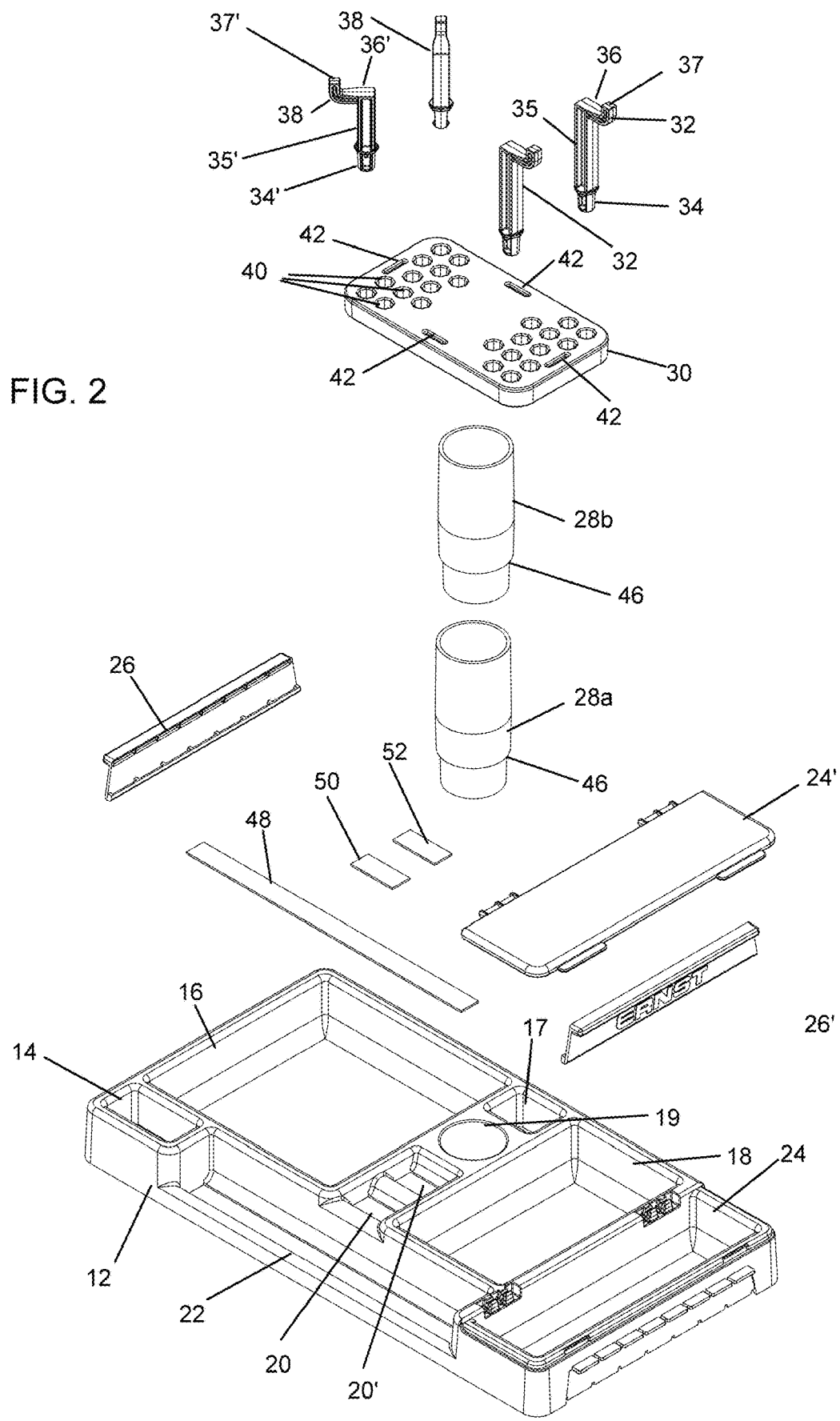
FIG. 2 is an exploded view of an assembled hobby stand of FIG. 1.

Referring to FIG. 2, an exploded view of the hobby stand, the mounting post 28 may be provided as two portions 28a and 28b, wherein one of the portions can be installed to the receptacle 19 in the base to provide a first mounting height, or the two portions 28a and 28b can be fit together and be installed in the base to provide a taller mounting height above the base portion. The lower portion of each of portions 28a and 28b have a shoulder portion 46 and are narrower at the lower ends thereof, to allow a fit into the receptacle 19 (or the lower end of portion 28b into the upper end of portion 28a).

Magnetic strip portions 48, 50 and 52 are provided, sized to fit onto the surfaces of receptacles 22, 20 and 20' respectively, providing features to retain small metal parts from being inadvertently lost.

Receptacle 24 has a lid 24', which may optionally be of clear material to allow inspection of contents of the receptacle without opening the lid. Lid 24' has locking tabs that snap into the base to shut securely.

Figure 3:
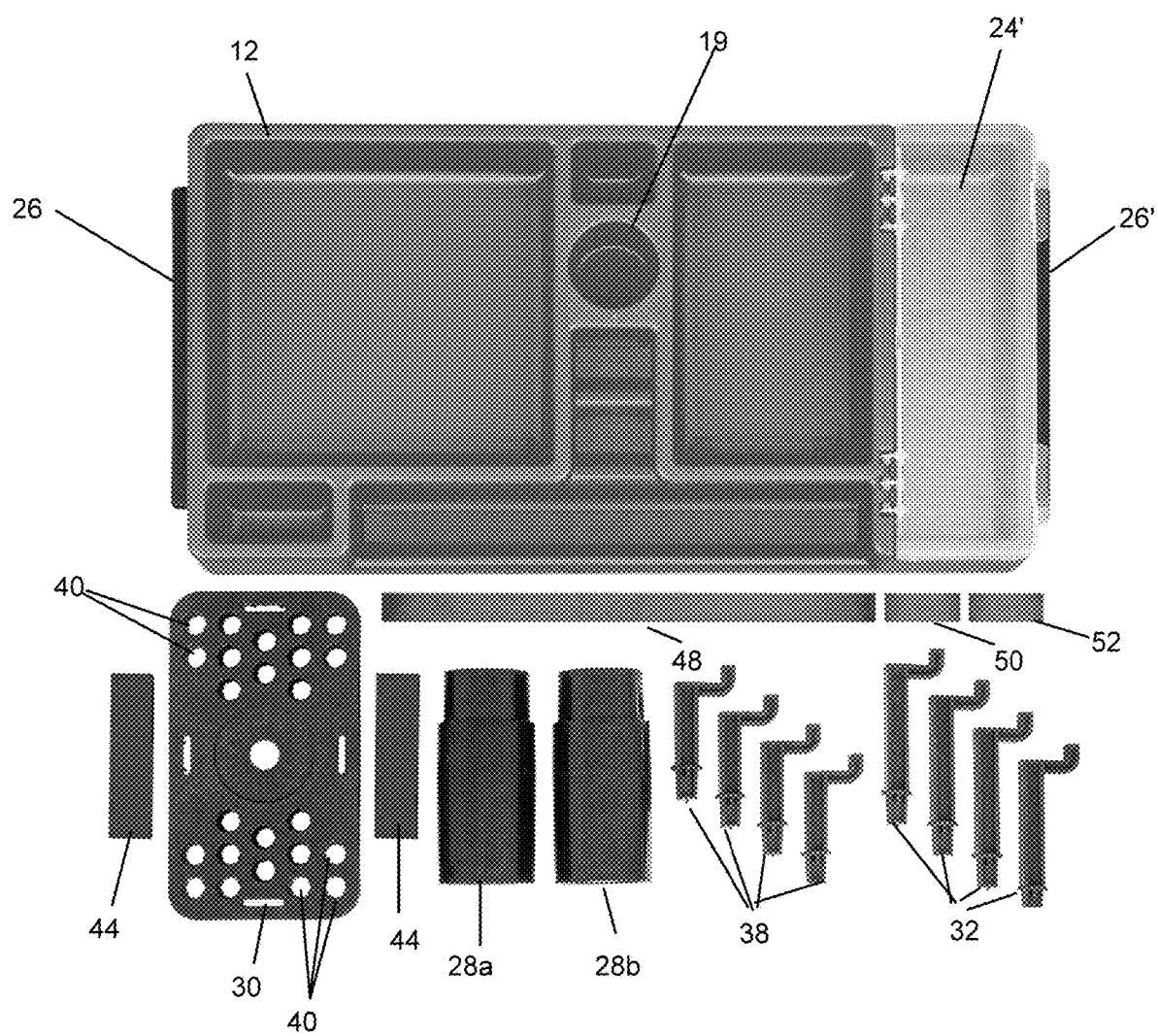
FIG. 3 is a top view of the hobby stand of FIG. 2 with the components spread out prior to assembly.

In use, the hobby stand, which may be shipped in a broken down form as shown in FIG. 3, is assembled by placing the magnetic strip portions in their respective receptacles, secured thereto by adhesive backing, for example. The rubber grip handles 26, 26' and lid 24' may come preinstalled on the base. The bottom most portion of the rubber handles provides an anti-skid feature to the base, so that it is less inclined to unintended lateral movements when sitting on a surface. One of the posts 28a, or 28b is inserted into the receptacle 19 and the other of the posts may be optionally inserted into the top of the post already in receptacle 19. Platform 30 is positioned on top of the post (a mating profile is on the bottom of the platform to fit onto the top of the mounting post). The work project may be positioned onto the platform, either without any of the support arms, wherein the project rests on grip pad(s) 44, or one or more of the support arms may be inserted into the various mounting holes 40, in a desired configuration, to provide support points for receiving the workpiece and supporting it in a desired position.

The platform 30 is able to rotate about the top of the mounting post, allowing the project to be rotated to allow access to different sides of the project without having to move the base. The support arms can be of different heights, two such different heights shown in the illustrated embodiment, to accommodate different requirements for positioning of the project.

Still referring to FIG. 3, a typical hobby stand includes one base 12 with lid 24', two center columns 28a, 28b, one platform 30, four long arms 32, four short arms 38, three magnetic strips 48, 50, 52, two foam grip pads 44. Dimensions of the base of a preferred embodiment are 21.5"×11"×2.25".

When assembled as in FIG. 1, the height of the top of support arms in the particular configuration shown is 14 inches above the bottom of the base. A suitable construction material for the components of the hobby stand is plastic, and the stand may be formed by injection molding, for example.

Figure 4:
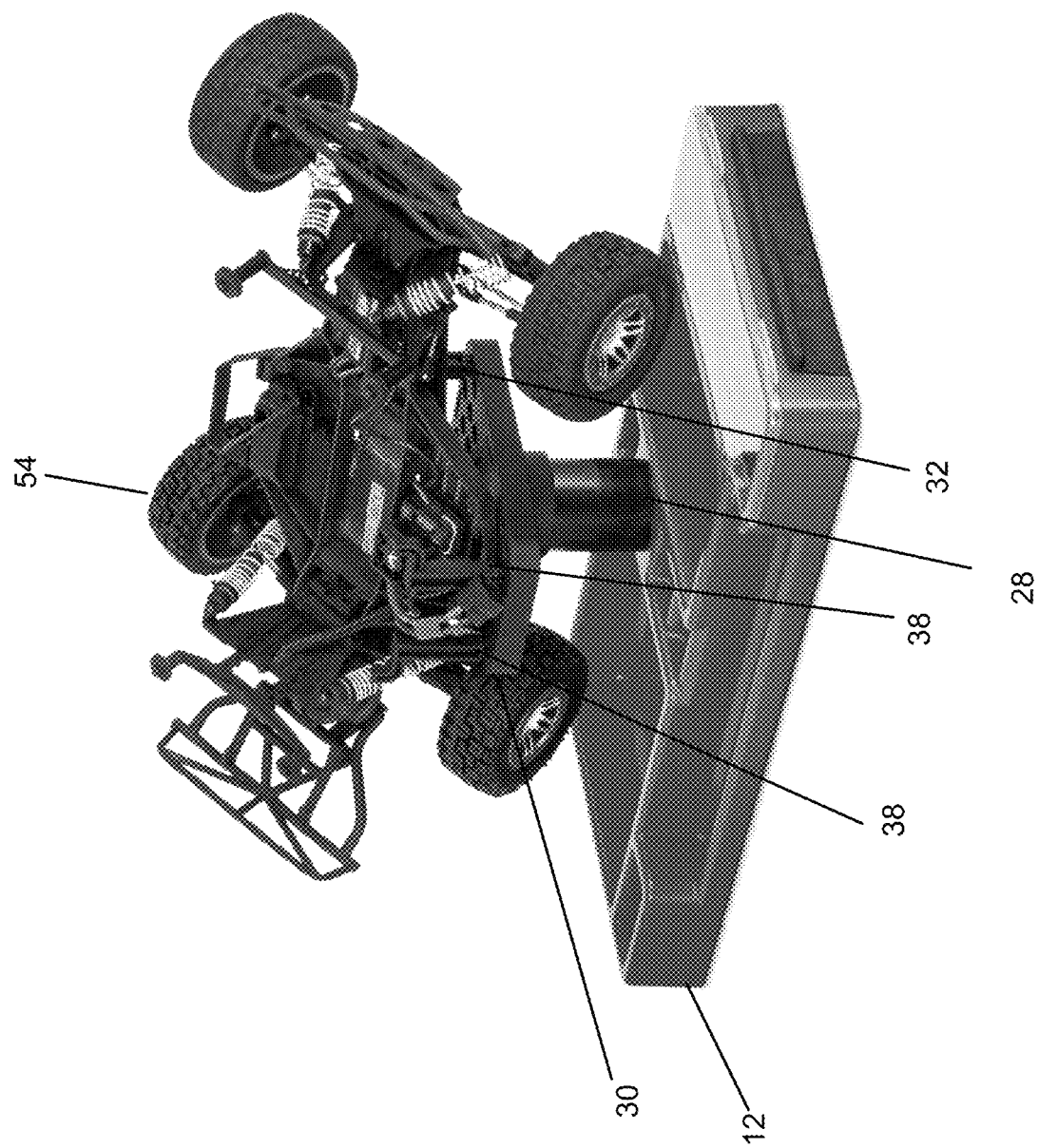
FIG. 4 is a perspective view of the hobby stand with a workpiece mounted thereon.

FIG. 4 is a perspective view of the hobby stand with a workpiece 54 mounted thereon, in this case, an RC model car. In the illustrated configuration, lower portions of support arms 38 are mounted at the forward face of platform 30 and are used as stops to press against the side of the workpiece, to prevent it from sliding off the platform, while support arms 32 are mounted at the rear of the platform 30 and are contacting the workpiece at the upper portions of the arms, so that the workpiece is supported at an angle to the platform.

The offset posts on the upper of the support arms, together with the rotatable placement of the support arms into the mounting holes 40 enables changing the interactive fitment of the device and a workpiece, to accommodate a variety of different workpiece configurations and sizes.

Thus, an improved hobby stand is provided for supporting a workpiece and keeping it in place for display of the project or for working on the project. There are both short and long arms included for height and placing options. Alternatively, the arms can be removed so that large items can rest directly on the platform's foam grip pads. The sturdy platform rotates 360 degrees for easy access and can be positioned at two different heights in the illustrated embodiment. Projects can even be strapped on to the platform for added security using the provided slots 42.

The base of the stand serves as a work tray with an anti-skid bottom, rubber grip handles and easy-scoop compartments. There are three compartments with magnets to keep small metal pieces in place, two larger open top compartments and one enclosed compartment. The layout will accommodate a wide range of items whether they are fasteners, tools, batteries, assembly components, paints and brushes, for example.

The hobby stand can have many uses and is suitable for hobby workpieces such as models, crawlers, monster trucks, on-road vehicles, electric boats, RC projects, scale modeling, model railroading and crafts, whether used for assembly, repairs, painting, display and more.

While a preferred embodiment of the technology has been shown and described, it will be apparent to those skilled in the art that many changes and modifications may be made without departing from the broader aspects. The appended claims are therefore intended to cover all such changes and modifications as fall within the true spirit and scope of the technology.

What is claimed is:

1. A hobby stand, comprising:
   a platform for mounting a workpiece thereon; and
   a support carrying said platform, for maintaining said platform at a height above a surface,
   further comprising a base member for mounting said support, said base member having plural storage compartments defined therein,
   wherein at least one of said plural storage compartments comprises a magnetic portion for storing metal parts therein.

2. The hobby stand according to claim 1, wherein said platform is rotatable on said support in a plane.

3. The hobby stand according to claim 1, further comprising at least one support arm for mounting to said platform, for providing support to the workpiece.

4. The hobby stand according to claim 3, wherein said platform carries plural mounting holes for receiving said at least one support arm in selected ones of said plural mounting holes, for selectively positioning said support arm on said platform.

5. The hobby stand according to claim 1, wherein said platform carries at least one grip pad for contact with the workpiece.

6. The hobby stand according to claim 1, wherein said platform includes at least one securement feature comprising an opening formed in said platform for engaging with a securing strap for enabling the workpiece to be secured to the platform.

7. A hobby stand, comprising:
   a platform for mounting a workpiece thereon; and
   a support carrying said platform, for maintaining said platform at a height above a surface,
   further comprising a base member for mounting said support, said base member having plural storage compartments defined therein,
   wherein at least one of said plural storage compartments comprises a closable lid for providing an enclosed storage space.

8. The hobby stand according to claim 7, wherein said platform carries at least one grip pad for contact with the workpiece.

9. The hobby stand according to claim 8, wherein said at least one grip pad comprises a foam pad.

10. The hobby stand according to claim 7, wherein said platform includes at least one securement feature comprising an opening formed in said platform for engaging with a securing strap for enabling the workpiece to be secured to the platform.

11. The hobby stand according to claim 7, wherein said platform is rotatable on said support in a plane.

12. The hobby stand according to claim 7, further comprising at least one support arm for mounting to said platform, for providing support to the workpiece.

13. The hobby stand according to claim 12, wherein said platform carries plural mounting holes for receiving and selectively positioning said at least one support arm on said platform.

14. The hobby stand according to claim 7, further comprising plural support arms for mounting to said platform, for providing support to the workpiece.

15. The hobby stand according to claim 14, wherein said platform carries plural mounting holes for receiving ones of said plural support arms in selected ones of said plural mounting holes, for selectively positioning said support arms on said platform.

16. The hobby stand according to claim 14, wherein at least a first and a second one of said support arms are of different lengths to enable the hobby stand to accommodate workpieces of different shapes.

17. A hobby stand, comprising:
- a support rotatably supporting a platform, said platform for mounting a workpiece, said support for maintaining said platform at a height above a surface;
- at least one support arm for mounting to said platform, for providing support to the workpiece, said platform carrying plural mounting holes for receiving said at least one support arm in a selected one of said plural mounting holes, for selectively positioning said support arm on said platform,
- further comprising a base member for mounting said support, said base member having plural storage compartments defined therein.

18. The hobby stand according to claim 17, wherein at least one of said plural storage compartments comprises a magnetic portion for storing metal parts therein.

19. The hobby stand according to claim 17, wherein said platform carries at least one grip pad for contact with the workpiece, wherein said at least one grip pad comprises a foam pad.

20. The hobby stand according to claim 17, wherein said platform includes at least one securement feature for enabling the workpiece to be secured to the platform, wherein said securement feature comprises an opening formed in said platform for engaging with a securing strap.

* * * * *